(12) United States Patent
Pedersen

(10) Patent No.: US 8,088,280 B2
(45) Date of Patent: Jan. 3, 2012

(54) AQUEOUS LIQUID TREATMENT

(76) Inventor: Paul Michael Pedersen, Upper Marlboro, MD (US)

( * ) Notice: Subject to any disclaimer, the term of this patent is extended or adjusted under 35 U.S.C. 154(b) by 128 days.

(21) Appl. No.: 12/653,157

(22) Filed: Dec. 9, 2009

(65) Prior Publication Data

US 2010/0096313 A1 Apr. 22, 2010

Related U.S. Application Data

(63) Continuation-in-part of application No. 11/206,311, filed on Aug. 17, 2005, now Pat. No. 7,641,793.

(60) Provisional application No. 60/602,019, filed on Aug. 17, 2004.

(51) Int. Cl.
*C02F 1/48* (2006.01)

(52) U.S. Cl. ........................ 210/222; 99/277.1

(58) Field of Classification Search .................. 210/222; 99/277.1
See application file for complete search history.

(56) References Cited

U.S. PATENT DOCUMENTS

| | | | |
|---|---|---|---|
| 4,888,113 A | 12/1989 | Holcomb | |
| 4,956,084 A | 9/1990 | Stevens | |
| 5,113,751 A | 5/1992 | Holcomb et al. | |
| 5,273,648 A | 12/1993 | Caiozza et al. | |
| 5,354,462 A | 10/1994 | Perritt | |
| 5,510,024 A | 4/1996 | Caiozza | |
| 5,573,664 A | 11/1996 | Kuo | |
| 5,733,447 A * | 3/1998 | Makar | 210/222 |
| 5,804,068 A * | 9/1998 | Reed | 210/222 |
| 6,755,968 B2 | 6/2004 | Sato | |
| 7,641,793 B2 * | 1/2010 | Pedersen | 210/222 |

* cited by examiner

*Primary Examiner* — David A Reifsnyder

(57) ABSTRACT

A container for magnetically activating water comprises a container having recesses as a part of the structure of the container, each of the recesses containing a magnet. The recesses and the magnets can be arranged in a set array in the structure of the container or can be in a random array. The recesses and the magnets preferably are in the sidewall of the container, but can additionally be in the bottom surface of the container. The magnets can be maintained within the recesses by a band that surrounds the recesses and the magnets, or by the magnets and the recesses having structures whereby the magnets are held within the recesses. A band also can be used to secure the magnets in the recesses. The recesses and magnets can be of essentially any compatible shape. Preferably the container is generally round and may have a gripping region.

20 Claims, 4 Drawing Sheets

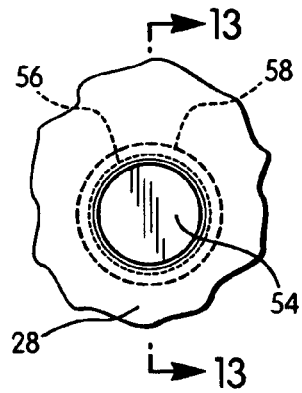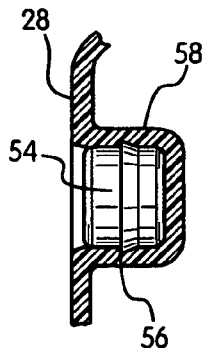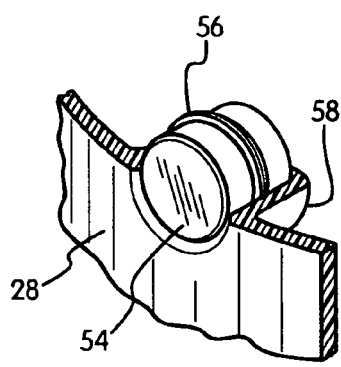
FIG. 12    FIG. 13    FIG. 14
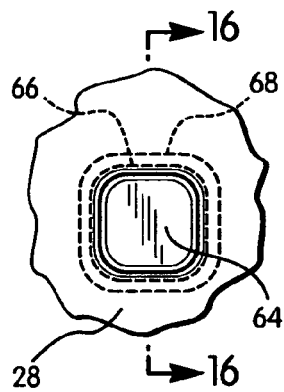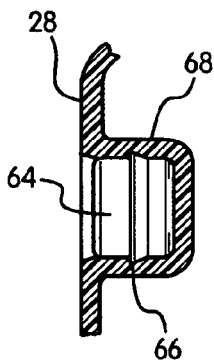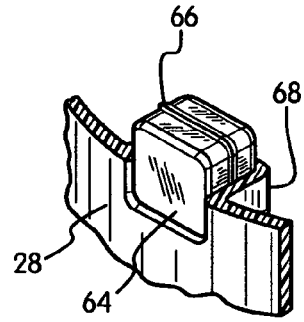
FIG. 15    FIG. 16    FIG. 17
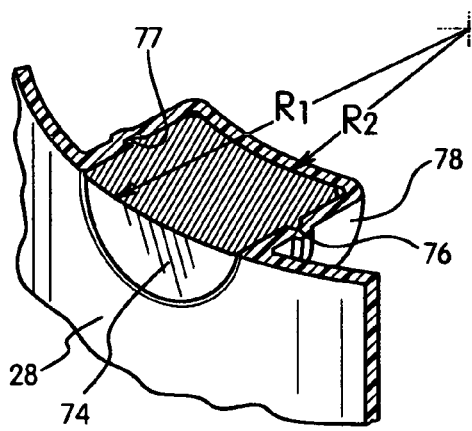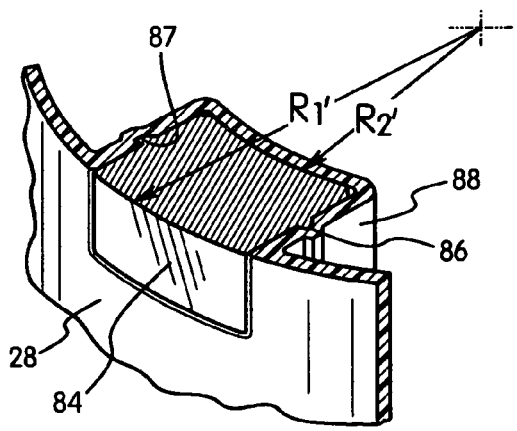
FIG. 18    FIG. 19

AQUEOUS LIQUID TREATMENT

This application is a continuation-in-part of U.S. application Ser. No. 11/206,311 filed Aug. 17, 2005, now U.S. Pat. No. 7,641,793, which claims priority from U.S. Application Ser. No. 60/602,019 filed Aug. 17, 2004, which are incorporated herein by reference in their entirety.

This invention relates to a device and method to treat aqueous liquids. More particularly this invention relates to a device and method to magnetically treat aqueous liquids.

BACKGROUND OF THE INVENTION

It is known to treat water and other liquids with magnets to purify the water, reduce hardness, reduce scaling, and improve the taste of water based beverages. Water is a polymer in an (—H—O—H—O—H—O—) of an n-dimensional structure. There is a continuous hydrogen bonding to form this structure. This hydrogen bonding produces a sufficient chain length to create a liquid from this string of hydrogen and oxygen atoms. Since water has a polar structure due to the hydrogen bonding it will be susceptible to be affected by an applied magnetism. The positive/negative structure of the water molecules will be affected by the north/south fields of magnets.

Water is paramagnetic. Paramagnetism occurs primarily in substances in which some or all of the individual atoms, ions, or molecules possess a permanent magnetic dipole moment. The magnetization of such matter depends on the ratio of the magnetic energy of the individual dipoles to the thermal energy. Water has a dipole moment.

Ground water contains thousands of particles and micro-elements whose impurities give rise to the surrounding electron shells: cations (+), anions (−). "Pure" water is a polar liquid, i.e. part of the water molecule has a positive and part of it has a negative, electrical charge, but overall the net electrical charge is negative. Thus, the water molecule being a small magnet (dipole), one may effect its magnetic (or electric) field by causing the molecule to turn or rotate in one direction or the other, taking on a positive or negative higher potential, depending, whether the S (South, positive) or N (negative) outside magnetic field had been applied.

Water, being dipolar, can be partly aligned by an electric field and this may be easily shown by the movement of a stream of water by an electrostatic source. Even partial alignment of the water molecules with the electric field will cause pre-existing hydrogen bonding to become bent or broken. The balance between hydrogen bonding and van der Waals attractions is thus biased towards van der Waals attractions giving rise to less cyclic hydrogen bonded clustering.

Magnets affect the bonding angle between the hydrogen and the oxygen atom in the water molecule. Magnetized water causes the hydrogen-oxygen bond angle within the water molecule to be reduced from 104 to 103 degrees. This in turn causes the water molecule to cluster together in groups of 6-7 rather than 10-12. The smaller cluster leads to better absorption of water across cell walls.

In U.S. Pat. No. 4,888,113 there is described a device that can be clamped onto a pipe for the treatment of water passing through the pipes. An objective is to reduce the amount of scaling of the pipes by the minerals dissolved in the water. U.S. Pat. No. 5,573,664 disposes magnets in a shower head to treat the shower water. The water can be treated to enhance the cleaning and treatment of the skin. U.S. Pat. No. 5,113,751 involves the treatment of coffee beverage water. The treated water and/or coffee enhances the flavor of the coffee. These are some of the uses of magnetism to enhance the use of water. It makes the water more useful and more palatable. It further makes the water more bio-available in that it can be absorbed faster by body tissue.

The present invention is directed to the treatment of water containers with magnets to enhance the utility of the water. The water will be more bio-available when directly ingested and will enhance the flavor of a beverage when used to produce a beverage. The water will be more effectively used by a person's body. The advantage of the present magnetic units is that they can be fitted to a wide range of container shapes and sizes. In addition the magnets can be arranged in various arrays around a container. In this way there is a maximum of versatility. The treatment of the water can be customized to the shape and size of the container and the needs of an individual. As used herein the term container includes any structure for holding static water. This can be a tank, jug, bottle, carafe, pitcher, pipe, filter unit and any other structure for containing static water. Further as used herein the term water includes viscous substances which contain water such as gels, lotions, mixtures, suspensions and other liquid/solid and liquid/liquid combinations.

BRIEF DESCRIPTION OF THE INVENTION

The invention comprises a container that has a plurality of recesses, with a magnet inserted into each recess. The container can be of any shape and of essentially any non-magnet material. Preferably, it will be round or oval in cross-section to enhance gripping the container. The recesses and the magnets preferably are in the sidewalls of the container. However, there can be a recess and a magnet in the bottom surface of the bottle. The magnets can be in a friction fit into the recesses of the container, or the recesses can lock the magnets into the recesses by means of a projection on the slot. In addition the magnets can have a structure to lock the magnets into the recesses. The magnets can be of essentially any shape. The size and shape of the magnets must be in alignment with the size and shape of the recesses.

The container and magnet structure may also include a band around the container in the region of the magnets to further secure the magnets in place. These containers with magnets are particularly useful for people that are involved in an exercise routine or activity. It provides an activated water which in turn can provide an added benefit to the individual.

The container usually will be constructed of a plastic but can be of essentially any substantially non-magnet material. The plastic materials include the polymers and co-polymers of ethylene or propylene, polyvinyl chloride and polyesters such as polyethylene terephthalate. These plastics are non-magnetic materials. The container also can be of aluminum or an aluminum alloy or a non-magnet stainless steel.

DESCRIPTION OF THE DRAWINGS

FIG. 12 is a segment of the sidewall showing a circular magnet secured in the sidewall.

FIG. 13 is a cross-sectional view of the magnet of FIG. 12 along line 13-13.

FIG. 14 is a cutaway view of the magnet of FIG. 13 in the container sidewall.

FIG. 15 a segment of the sidewall showing a quadrangular magnet secured in the container sidewall.

FIG. 16 is a cross-sectional view of the magnet of FIG. 12 along line 16-16.

FIG. 17 a segment of the container sidewall showing a quadrangular magnet secured in the sidewall.

FIG. 18 is an alternative embodiment of the bottle and magnet of FIGS. 12 to 14.

FIG. 19 is an alternate embodiment of the bottle and magnet of FIGS. 15 to 17.

DETAILED DESCRIPTION OF THE INVENTION

The invention will be set out in the preferred embodiments with reference to the drawings. However, the invention can be modified but will still be within the present concept.

Figure 1:
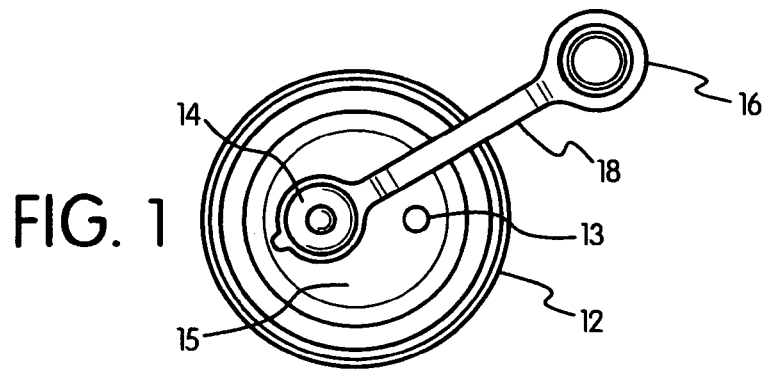
FIG. 1 is a top plan view of the closure of the container of FIG. 2.
Figure 2:
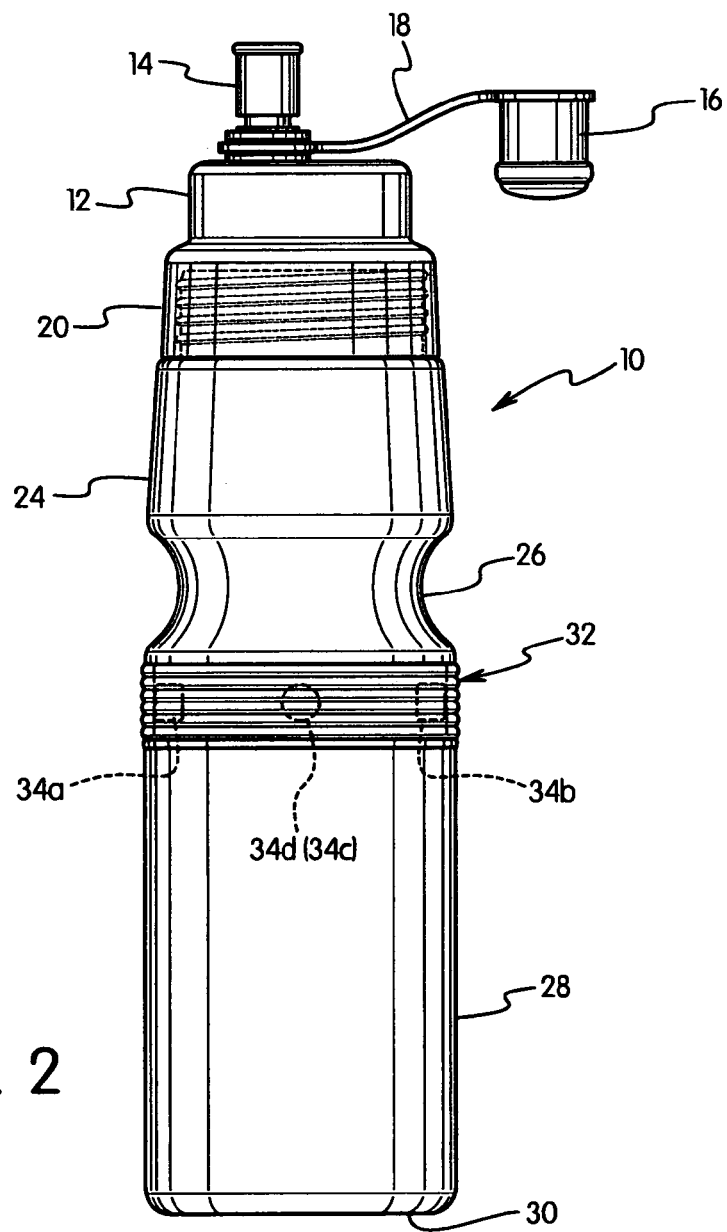
FIG. 2 is an elevation view of the container and closure with the recesses and magnets in a set array.
Figure 3:
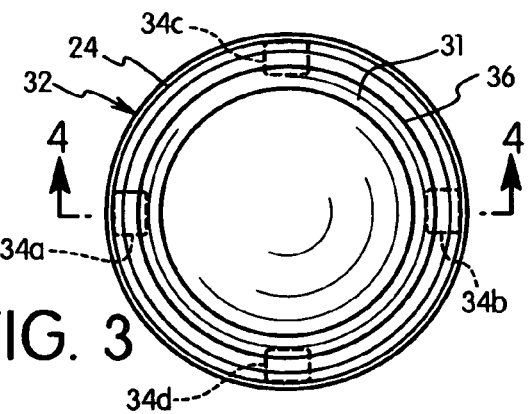
FIG. 3 is a bottom plan view of the container of FIG. 2.

FIG. 1 is a top plan view of the container 10 of FIG. 2. The container 10 has closure 12. The closure has an upper part 22 and a lower part 20. The lower part 20 is threaded on an inner surface and attaches to a mating threaded upper part of the container 10. A spout 14 projects from the top surface 15 of closure 12. A lid strap 18 attaches lid 18 to spout 14. The top surface has a vent 13 to allow air to enter the container 10 after a portion of liquid has been removed. This equalizes the pressure within the container to the exterior pressure. The container 10 has an upper portion 24, mid-portion 26 and a lower portion 28. There is a bottom surface 30. On the lower portion there is shown magnets 34a, 34b, and 34c. There also is shown a band 32 which secures the magnets within recesses in the container sidewall 28, the band 32 and the magnets 34a, 34b, 34c, and 34d. Magnets also can be within the upper part.

Figure 5:
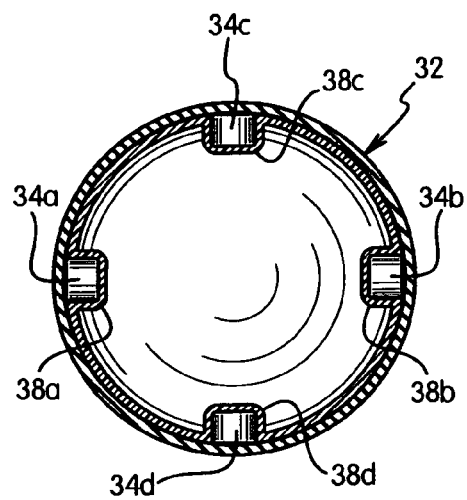
FIG. 5 is a view of the container of FIG. 4 along line 5-5.
Figure 4:
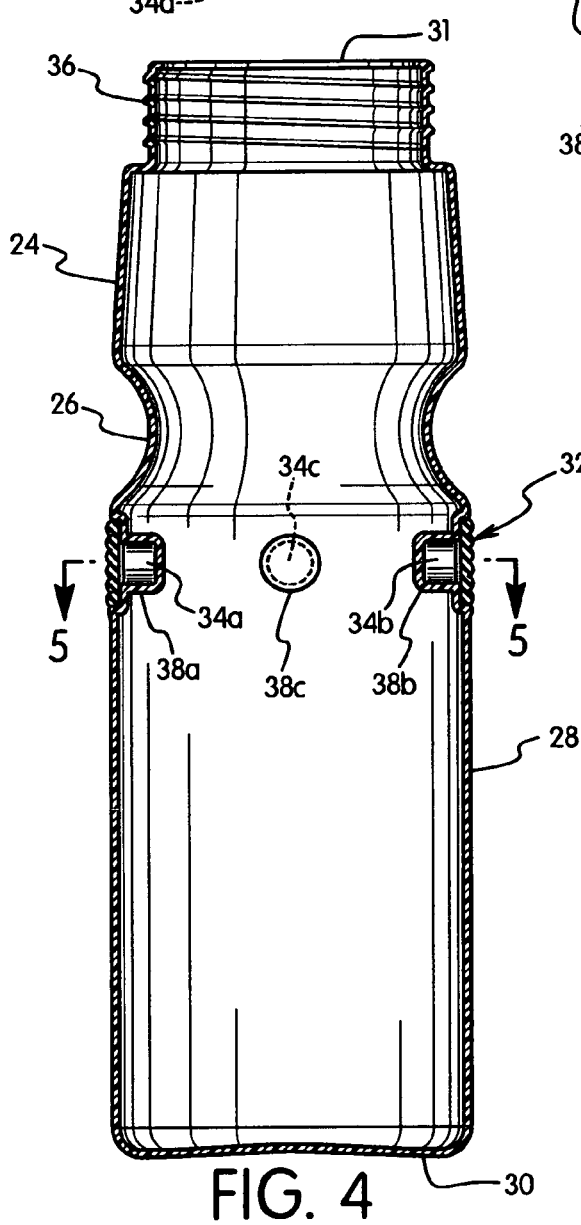
FIG. 4 is an elevation view of the container in cross-section.
Figure 6:
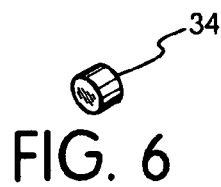
FIG. 6 is a perspective view of a cylindrical magnet.
Figure 7:
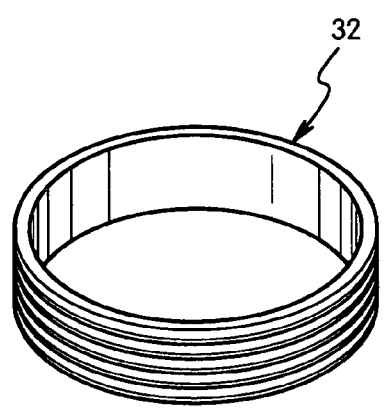
FIG. 7 is a perspective view of the band holder for the container.

In FIGS. 2 and 4 the magnets are in a set array around the container. FIG. 4 is a bottom plan view of the container 10 of FIG. 1. This view shows the bottom surface 30, the lower sidewall 28, the bottle mid-sidewall 26 and the bottle upper sidewall 24. There also is shown the top opening 31 in a spout 36 with threads 37. There is shown in this view magnets 34a, 34b, and 34c. These magnets are in recesses 38a, 38b and 38c. The recesses are pockets within the sidewall formed during the forming of the container. FIG. 5 is s cross-sectional view of the container along line 5-5 of FIG. 4. This view shows the recesses and the magnets in more detail. The recesses can be produced during the molding of the container through the use of mold pins through the mold wall with the mold pins removed to release the container from the mold. FIG. 6 shows the magnet 34a. This is a cylinder with a circular cross-section. FIG. 7 shows a band 32 that can be used to secure the magnets in the recesses.

Figure 8:
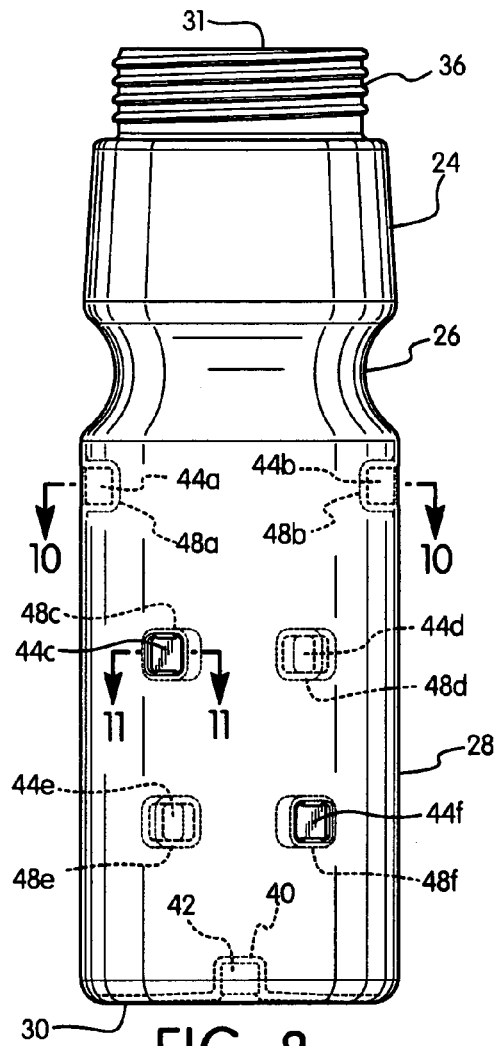
FIG. 8 is a perspective view of the container with the plurality of magnets and recesses in a random array in the container sidewall.
Figure 9:
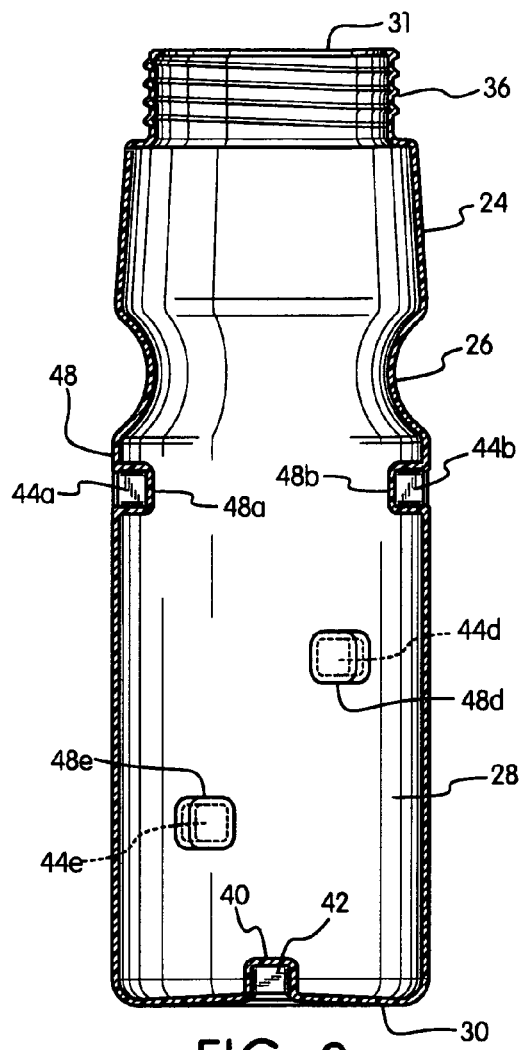
FIG. 9 is a view of FIG. 8 in a vertical cross-section.
Figure 10:
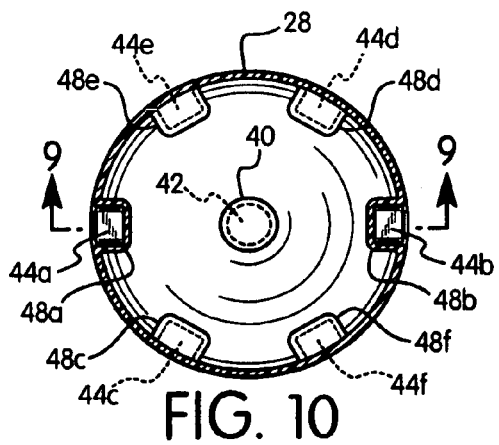
FIG. 10 is a view of the container of FIG. 8 along line 10-10.
Figure 11:
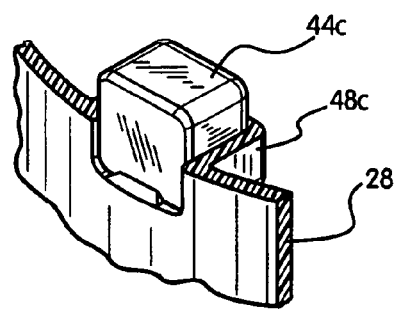
FIG. 11 is a cutaway view of a magnet with a quadrangular cross-sectional shape in the sidewall of the container.

In FIG. 8 the magnets are quadrangular in shape, in a random array, and there also is a magnet in the container bottom surface. The container parts remain as the upper sidewall 24, mid-sidewall 26 and the lower sidewall 28. The magnet 42 is in the bottom surface 30 of the container. Here there are six sidewall magnets and a bottom surface magnet. There are magnets 44a and 44b in recesses 48a and 48b respectfully at about the sides of the front surface of sidewall 28. The front surface contains magnets 44c and 44d which are in recesses 48c and 48d, respectively. In dashed lines the magnets 44e and 44f in the rear surface can be seen. These are in recesses 48e and 48f respectfully. FIG. 9 shows the container in an elevational cross-section. This view shows more clearly the location of the magnets 44a, 44b, 48e and 48f on the rear surface of the container. The bottom surface magnet 42 in the recess 40 is shown in more detail in this view. FIG. 10 is a cross-sectional view of the container of FIG. 8 along line 13-13. Magnets 44a, 44b, 44c, 44d, 44e and 44f are shown in recesses 48a,48b,48c,48d, 48e and 48f respectively. Magnet 42 in recess 40 in the bottom surface 30 remains in a circular shape. FIG. 11 shows magnet 44c being held in the recess 48c of sidewall 28 by means of the projection 42.

FIG. 12 shows magnet 54 with a circular cross-section secured in recess 58 of the sidewall 28. As is better seen FIG. 13 in the cross-section of FIG. 12 the magnet 54 has a ridge 56 which secures the magnet 54 in recess 58. The recess 58 can have a slot into which the ridge 56 can be more securely held. However, it can be held solely by friction. FIG. 14 shows the wall 28 in a cutaway view with the magnet 54 secured in recess 58. FIG. 15 shows magnet 64 with a quadrangular cross-section secured in recess 68 of the sidewall 28. As is better seen in the cross-section of FIG. 16 the magnet has a ridge 66 which secures the magnet 64 in recess 68. The recess 68 can have a slot into which the ridge 66 can be more securely held. However, it can be held solely by friction. FIG. 17 shows the wall 28 in a cutaway view with the magnet 64 secured in recess 68 by ridge 66.

FIG. 18 shows an alternate embodiment to that if FIGS. 12 to 14 where the magnet front and rear surfaces have a curvature that is similar to that of the container surface 28 and the inner surface of the recess 78. The curvature of the front surface of the magnet 74 is R1 and the curvature of the rear surface of the magnet is R2. The magnet has a ridge 76 which fits into slot 77 of the recess 78 to better secure the magnet 74 in the recess 78.

FIG. 19 shows an alternate embodiment to that if FIGS. 15 to 17 where the magnet front and rear surfaces have a curvature that is similar to that of the container surface 28 and the inner surface of the recess 88. The curvature of the front surface of the magnet 84 is R1 and the curvature of the rear surface of the magnet is R2. The magnet has a ridge 86 which fits into slot 87 of the recess 88 to better secure the magnet 84 in the recess 88.

The embodiments if FIGS. 18 and 19 will better maintain the magnets within the recesses. As the container is flexed the magnets will not be easily dislodged from the recesses. This is very useful when the container is a plastic. Plastic containers tend to be flexible. When the container is a metal with a low level of attraction to magnets a ridge on the magnets can be eliminated since the low level of magnetic attraction will assist in maintaining the magnets in the recesses. In such instances a friction and optionally the use of a band will secure the magnets within the recesses.

The magnets can be used in various arrays around a container. These include a (-N-S-N-S-N-S-), (-S-S-N-N-S-S-), (-S-N-N-S-N-N-), (-N-S-S-N-S-S-), (-N-N-N-N-N-N-) or (-S-S-S-S-S-S-) array. This will be determined by how the magnets are mounted in the recesses and how the recesses are arranged on a container. It also will be determined with regard to the size of the container, the beverage contents of the container, the mineral content of the beverage and other factors such as the desired effect to be produced. The number of magnets used also will depend on these many factors. These can range from 1 to 20 magnets or more, and usually will be 3 to 10 magnets. The strength of the magnets will range from about 500 gauss to about 20,000 gauss or more and usually about 1000 gauss to about 10,000 gauss. The magnets will be mounted at an angle of about 150 degrees to about 210 degrees to the axis of the container, and usually at about 180 degrees.

The container can be constructed of essentially any substantially non-magnet material. The preferred materials are plastics and metals that are substantially non-magnet. By non-magnetic it is meant that a magnet has a minimal attraction to the material of the container. The preferred plastics are the polymers and copolymers of a polyene such as polyethylene and polypropylene, a polyvinylchloride polymer and a polyester polymer such as polyethylene terephthalate. Metals include the metals and alloys of aluminum, titanium and substantially non-magnet stainless steels. The volume of the containers will range from 250 ml to 1500 ml containers. However, there is no restriction on the volume of the containers.

The liquids that are to be dispensed from the container are aqueous liquids such as water, flavored waters and vitamin and other enhanced waters. However, the usual liquid will be a filtered water. AQUASPACE filtered water is a preferred liquid to be contained and dispensed from the containers.

EXAMPLE

The following example shows the effect of magnetized water on the growth of an organism, in this case being Mung bean plants.

Various orientations of magnetic fields were used to treat both filtered and non-filtered tap water to determine what effect the magnet orientation itself had in the germination and growth patterns of the Mung bean plants. The magnet orientations were duplicated on both water bottles containing filtered and also non filtered city tap water. Non-magnetically treated filtered and unfiltered city tap water bottles were also as a control. A duplicate container of Mung beans was used to validate that the results were consistent and valid.

The experiment was conducted under controlled conditions where variables pertaining to germination rate e.g. light, temperature, humidity, soil condition, etc were constant. Ten Mung beans were placed in the same orientation in the containers with soil that was the same for all containers. Containers were all filled with the same soil to the same depth and 10 Mung beans were placed in the same orientation in each cup. Two cups were then selected randomly for each water sample.

The study was conducted to observe and compare the difference in the germination and growth patterns of the Mung beans when subjected to four basic types of water samples:
1. City tap water which measured a 1.0 ppm of chlorine residual throughout the experiment.
2. Filtered city tap water
3. Magnetized Filtered city tap water subjected to 6 various magnet orientations.
4. Magnetized city tap water subjected to 6 various magnet orientations The results were interesting in that the containers of Mung beans responded differently with the following results:
1. The city tap water fed containers averaged a 15% germination success rate and demonstrated a poor growth pattern and averaged a height of 9.36 cm.
2. The filtered water fed containers averaged an 85% germination success rate and demonstrated a healthy growth pattern and averaged a height of 14.00 cm.
3. The magnetized filtered water fed containers averaged a 100% germination success rate which was also demonstrated a faster growth rate as compared to both the filtered and non-filtered water. However, even though the growth pattern was clearly much healthier that of the City tap water there was observable differences in the growth patterns of the different types of magnetic oriented water.
   A. The seeds that were fed the south pole only treated water -S-S-S-S- germinated faster and grew at a faster rate. It was noticed however that the stalks did not grow strong enough to support the upper plant structure and averaged a height of 13.85 cm.
   B. The seeds that were fed the north pole only water -N-N-N-N- germinated slowest but were able to stand more erect and averaged a height of 11.16 cm.
   C. The seeds that were fed the -N-N-S-S- pole water germinated at a rate in between the A and B and were also as tall and stood erect and averaged a height of 13.015 cm.
   D. The seeds that were fed the -N-S-N-S- pole water germinated at a rate in between the A and B and were also as tall and stood erect and averaged a height of 10.675 cm.
   E. The seeds that were fed the water from a bottle that had both an -S-S-S-S- and N-N-N-N pole germinated at a rate in between the A and B and were also as tall and stood erect and averaged a height of 10.25 cm.
   F. The seeds that were fed with water mixed 50-50 with the A and B water germinated at a rate in between the A and B and also were as tall and stood erect and averaged a height of 11.025 cm.
4. The magnetized city tap (unfiltered) water fed containers averaged a 100% germination success rate which also demonstrated a faster growth rate as compared to non-magnetized water (both the filtered and non filtered). Remarkably, the germination rates and growth patterns were identical to the magnetized filtered water containers:
   A. The Mung bean seeds that were fed the south pole only treated water -S-S-S-S- germinated faster and grew at a faster rate. It was noticed however that the stalks did not grow strong enough to support the upper plant structure and averaged a height of 14.43 cm.
   B. The seeds that were fed the north pole only water -N-N-N-N-) germinated slowest but were able to stand more erect and averaged a height of 14.75 cm.
   C. The seeds that were fed the -N-N-S-S- pole water germinated at a rate in between the A and B and were also as tall and stood erect and averaged a height of 14.23 cm.
   D. The seeds that were fed the -N-S-N-S- pole water germinated at a rate in between the A and B and were also as tall and stood erect and averaged a height of 13.90 cm.
   E. The seeds that were fed the water from a container that had both a -S-S-S-S- and -N-N-N-N- pole germinated at a rate in between the A and B and were also as tall and stood erect and averaged a height of 14.325 cm.
   F. The seeds that were fed with water mixed 50-50 with the A and B water germinated at a rate in between the A and B and were also as tall and stood erect and averaged a height of 12.95 cm.

CONCLUSIONS

There were notable results of the seeds fed with magnetic treated and non-magnetic treated water. The magnet treated water was more available to the plant and promoted plant growth. It is more bio-available. Surprisingly, the seeds fed with non-filtered magnetic water responded almost identically to those fed with the filtered magnetic treated water (both had a 100%) germination rate. Yet the non-filtered (non-magnetic) water fed seeds responded poorly (15% germination rate). The filtered (non-magnet) fed seeds had an 85% germination rate. What was interesting is the effect that the magnets had on the non-filtered water compared to the non magnet non filtered water 100% germination rate vs. 15%.

However there were further results that proved interesting. In every case the magnet treated water whether filtered or not had a high germination rate. However, the configuration of the magnets had a noticeable and measurable effect on the over all health of the plant.

It was observed that the -S-S-S-S- configured promoted the fastest growth and averaged 14.13 cm but the stalks were not strong enough to support the leaves.

It was observed that the -N-N-N-N- configured promoted the slower growth and averaged 11.95 cm. The stalks were strong enough to support the leaves.

It was observed that when the -N-N-N-N- configured water was mixed equally with the S-S-S-S configured water promoted an average growth rate averaged 11.98 cm. The stalks were strong enough to support the leaves.

It was observed that when water from a bottle with both an -N-N-N-N- configured and -S-S-S-S- configured promoted an average growth rate and averaged 12.28 cm. The stalks were strong enough to support the leaves.

It was observed that the -N-S-N-S- configured promoted an average growth and averaged 12.28 cm. The stalks were strong enough to support the leaves.

It was observed that the -N-N-S-S- configured promoted an average growth and averaged 13.62 cm. The stalks were strong enough to support the leaves.

I claim:

1. A container for an aqueous liquid, the container comprising a body, the body having an open upper end and a sidewall, the sidewall having an interior surface and an exterior surface, a the exterior surface having a plurality of recesses, each of the plurality of recesses having a magnet, and a band encircles the plurality of recesses thereby holding the magnets in the recesses.

2. A container as in claim 1 wherein the recesses are spaced around the container.

3. A container as in claim 1 wherein the recesses are distributed in a set pattern in the exterior surface of the container.

4. A container as in claim 1 wherein the recesses are randomly distributed in the exterior surface of the container.

5. A container as in claim 1 wherein the recesses and the magnets are round in shape.

6. A container as in claim 1 wherein the recesses have a structure to maintain the at least one magnets within the recesses.

7. A container as in claim 6 wherein the recesses have a projection adjacent to the entrance to the recesses to maintain the at least one magnets in the recesses.

8. A container as in claim 1 wherein the magnets have a structure to maintain the magnets within the recesses.

9. A container as in claim 8 wherein the magnets have a projection.

10. A container as in claim 1 wherein there is a magnet in a recess in the bottom surface of the container.

11. A container for an aqueous liquid, the container comprising a body, the body having an open upper end, a closed lower end, a closed lower end and a sidewall, the sidewall having an interior surface and an exterior surface, the exterior surface having a plurality of recesses, each one of the plurality of recesses having a magnet, each one of the plurality of recesses having a projection which holds a respective magnet in a recess.

12. A container as in claim 11 wherein the recesses are distributed in a set pattern in the exterior surface of the container.

13. A container as in claim 11 wherein the recesses are randomly distributed in the exterior surface of the container.

14. A container as in claim 11 wherein there is a band around the recesses of the container, the band securing the magnets within the recesses.

15. A container as in claim 11 wherein the magnets have a structure to maintain the magnets within the recesses.

16. A container for an aqueous liquid, the container comprising a body, the body having an open upper end, a closed lower end, a closed lower end and a sidewall, the sidewall having an interior surface and an exterior surface, the exterior surface having a plurality of recesses, each one of the plurality of recesses having a magnet, each magnet having a projection which holds the magnet in a respective recess.

17. A container as in claim 16 wherein the recesses are distributed in a set pattern in the exterior surface of the container.

18. A container as in claim 16 wherein the recesses are randomly distributed in the exterior surface of the container.

19. A container as in claim 16 wherein there is a band around the recesses of the container, the band securing the magnets within the recesses.

20. A container as in claim 16 wherein the recesses have a structure to maintain the magnets within the recesses.

* * * * *